UNITED STATES PATENT OFFICE.

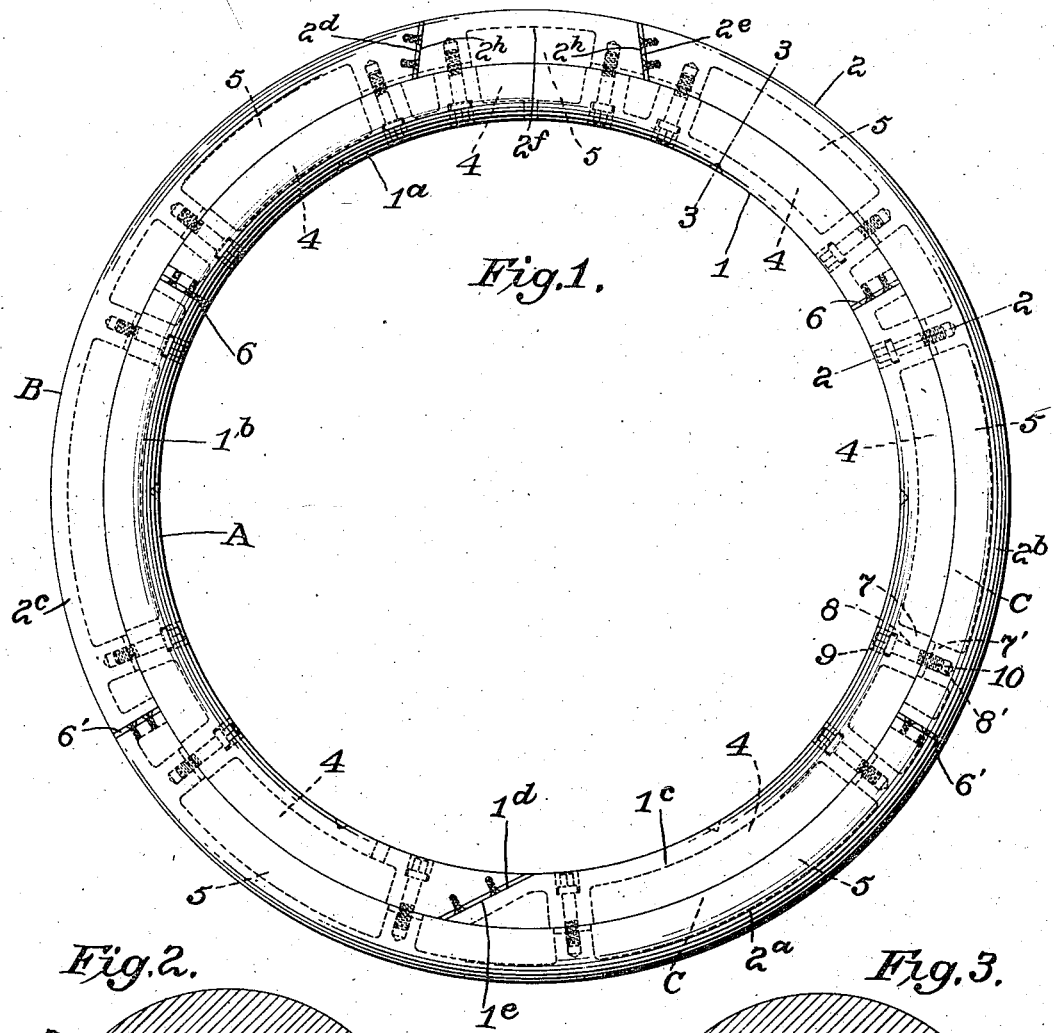
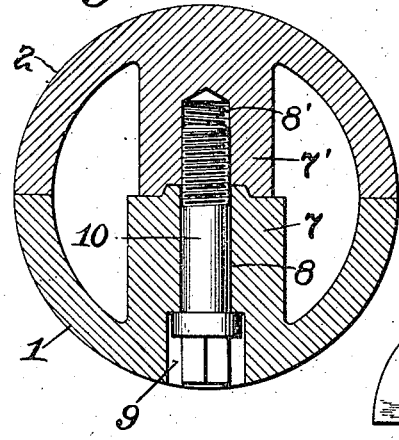
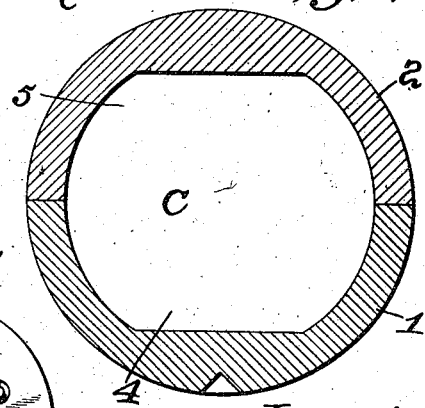

WALTER R. DENMAN, OF AKRON, OHIO, ASSIGNOR TO MILLER RUBBER COMPANY, A CORPORATION OF OHIO.

COLLAPSIBLE CORE.

1,170,423.

Specification of Letters Patent.

Patented Feb. 1, 1916.

Application filed July 29, 1915. Serial No. 42,618.

*To all whom it may concern:*

Be it known that I, WALTER R. DENMAN, citizen of the United States, residing at Akron, in the county of Summit and State of Ohio, have invented certain new and useful Improvements in Collapsible Cores, of which the following is a specification.

The present invention relates to improvements in collapsible cores, or mandrels, and pertains more particularly to that type of hollow core such as is used in the construction of pneumatic tire shoes.

The principal object of the invention is to provide a collapsible core composed of sections which, when assembled, will conform to the inner contour of a tire-shoe, and thus provide a suitable space within the tire casing for the inner pneumatic tube.

A further object consists in forming the collapsible core of a plurality of sections or segments which can be quickly and easily disassembled.

A still further object is to form the various segments and parts in such manner that they can be readily withdrawn through the inner annular opening of the finished tire shoe.

Collapsible hollow cores, composed of a plurality of interlocking segments, adapted to be disassembled and withdrawn from the inner circumferential opening of the tire-shoe, have been in general use, but applicant is the first, so far as he is aware, to construct a collapsible core composed of a plurality of segments which, when assembled, will form an annular core composed of two abutting circumferential sections adapted to be fastened rigidly together. By so constructing and assembling the segments, applicant is enabled to provide a collapsible core the several joints of which are not sealed, but instead are caused to abut one against another, and are then securely and firmly held in place by square head screws.

With these and other objects in view, the invention consists of the combination and arrangement of parts more fully described in the following specification, illustrated in the accompanying drawings, and pointed out in the appended claims.

In the drawings Figure 1 is a plan view of the assembled core; Fig. 2 is an enlarged transverse section on line 2—2 of Fig. 1; Fig. 3 is a similar view taken on the line 3—3 of Fig. 1; Fig. 4 is a detail.

Referring to the drawings, the collapsible core is composed of an inner core half A built up of a plurality of hollow segments 1 semicircular in cross section, adapted to be placed end to end, and provided with means for attaching them to the outer core half B. The outer core half B is similarly built up of a plurality of detachable segments 2 adapted to be placed end to end and to be secured to the segments of the inner core half A. The inner and outer core halves A and B are each constructed of a plurality of segments which are, in themselves, of semicircular cross section, and which, when assembled and secured together along a medial circumferential line of the core, present a continuous annular ring core of practically circular cross section throughout.

The inner core half A may be composed of any number of segments 1, but is here shown for the purpose of illustration as comprising three segments $1^a$, $1^b$, $1^c$. Each of these segments is formed with recesses 4 corresponding in size and shape to similarly formed recesses 5 in the several segments 2 of the outer core half B, so as to form, when the whole is assembled, a plurality of hollow chambers C throughout the length of the core. The segment $1^a$ of the inner core half A is formed with its ends squared or parallel to a radial line of the circular core. The segment $1^b$ is formed with one end squared adapted to abut against the squared end of the segment $1^a$, a small wear plate 6 being interposed between them, and preferably secured by means of screws to the end of one of the segments. The other end of the segment $1^b$ is formed with an inclined edge $1^d$ which is adapted to abut against a similarly formed inclined edge $1^e$ of the adjacent segment $1^c$. The opposite end of the segment 1ᶜ is similarly squared as is the corresponding end of the segment 1ᵇ to abut against the squared end of the segment 1ᵃ. The segments 2 of the outer core half B may be of any desirable number, but four are here shown. One of these segments 2ᵃ is formed with its ends squared similarly to the part 1ᵃ of the inner segment, while two of the others, 2ᵇ and 2ᶜ, are formed with one squared edge each and with one inclined edge 2ᵈ and 2ᵉ, respectively. The fourth segment 2ᶠ of the outer rim half is formed with both of its ends inclining, as shown at 2ʰ. The angle of inclination of the edges 2ʰ of the segment 2ᶠ is such that they converge inwardly toward the center of the core. Each of the inner segments of the core half A is provided with a plurality of outwardly extending square bosses or projections 7 having a centrally formed bore 8 and an inner counterbore 9 continuous therewith adapted to receive the shank and square head, respectively, of a bolt 10. The outer segments of the core half B are formed with correspondingly located bosses or projections 7′ provided with centrally disposed threaded bores 8′ adapted to receive the threaded shanks of the bolts 10. Circumferential grooves in bosses 7′ receive circumferential tongues on bosses 7 to perfectly and easily engage the two core halves when assembling. Semi-circular wear plates 6′ are interposed between the adjacent segments of the outer core half B similar to those described in connection with the inner core half A.

From the foregoing description it will be apparent how the parts of the inner and outer core halves A and B are placed end for end and securely attached, the inner to the outer, by means of the threaded bolts 10. In disassembling the parts after the tire shoe is completed, the bolts 10 are first removed from the part 1ᵇ of the inner core half A. This segment is then swung inwardly about its squared end as a fulcrum, and is removed through the circumferential opening along the inner edge of the tire shoe. Screws 10 are then removed from part 1ᶜ and the segment removed. Then remaining screws are removed from segments 2ᵇ and 2ᶜ. The segments 1ᵃ of the inner core half A and 2ᶠ of the outer core half B remain screwed together and are drawn toward the center of the core to free the other three segments of outer core half B for removing segments; 2ᵇ, 2ᶜ and 2ᵃ of the outer core half B are then removed from within the tire shoe in the sequence named.

By forming an inner supporting core half and an outer crown core half each composed of a plurality of circumferentially disposed segments the ease and facility with which the core can be disassembled and removed from the tire shoe are greatly increased. Furthermore, by designing and constructing a core according to the method of the present invention, great economy in the cost of production and in the replacement of parts is obtained.

I claim as my invention:—

1. A collapsible core comprising inner and outer sections detachable along a circumferential line extending around the core, each of said sections being of semi-circular cross section and composed of a plurality of hollow segments having interlocking end to end connections.

2. A collapsible core comprising inner and outer sections separably connected along a circumferential line extending around the core, each of said sections comprising a plurality of hollow segments of semi-circular cross section provided with interlocking end to end joints, the segments of one section adapted, when assembled to overlap the end joints of the segments of the other section.

3. A collapsible ring core comprising inner and outer sections detachable along a circumferential line extending around the core, each of said sections being of semi-circular cross-section and composed of a plurality of hollow segments having interlocking end to end connections, and means normally contained within the circular body of the core for detachably securing the segments of the inner section to the segments of the outer section, said means being accessible, for the purpose of disassembling the core parts, from the inner circumference of the ring core.

4. A collapsible core comprising inner and outer sections, each of said sections being of semi-circular cross section nd comprising a plurality of hollow segments each of which is semi-circular in cross section and means for detachably securing the several parts together.

5. A collapsible core comprising an inner core section composed of a plurality of hollow segments adapted to be placed end to end, and an outer core section similarly composed of a plurality of hollow core sections adapted to be placed end to end, and means for detachably securing the segments of the outer core section to the segments of the inner core section to form an assembled hollow ring core of circular cross section.

6. A collapsible core comprising an inner and outer section, each of substantially semi-circular cross section, said inner and outer sections each comprising a plurality of segments, and means for detachably securing the segments of the inner section to the segments of the outer section, in such manner as to enable the removal of the inner segments first when the core is disassembled.

7. A collapsible ring core comprising inner and outer sections separably connected along a circumferential line extending around the core, each of said sections composed of a plurality of hollow segments of semi-circular cross section, means for detachably securing the segments of the inner section to the segments of the outer section, and semicircular wear plates interposed between the adjacent segments of the inner and outer sections.

In testimony whereof I affix my signature in presence of two witnesses.

WALTER R. DENMAN.

Witnesses:
C. A. WOLF,
HAROLD WILSON.